United States Patent
Nakatake et al.

[11] Patent Number: 5,483,157
[45] Date of Patent: Jan. 9, 1996

[54] ROTARY SENSOR HAVING A STAY AND MOLDED BODY

[75] Inventors: Yoshiteru Nakatake; Kazuya Karino; Kazuo Yuhi, all of Miyazaki, Japan

[73] Assignee: Honda Lock Mfg. Co. Ltd., Miyazaki, Japan

[21] Appl. No.: 408,134

[22] Filed: Mar. 21, 1995

Related U.S. Application Data

[63] Continuation of Ser. No. 37,229, Mar. 26, 1993, abandoned.

[30] Foreign Application Priority Data

Apr. 18, 1992 [JP] Japan ................. 4-037541 U

[51] Int. Cl.6 ........................... G01P 3/44; G01R 33/038
[52] U.S. Cl. ........................... 324/174; 324/262
[58] Field of Search ............... 324/207.11–207.26, 324/173, 174, 166, 262, 239, 240; 336/110; 174/52.1, 52.2, 52.3

[56] References Cited

U.S. PATENT DOCUMENTS

| | | | |
|---|---|---|---|
| 4,680,543 | 7/1987 | Kohen | 324/207.15 |
| 4,725,041 | 2/1988 | Chauvin et al. | 251/129.15 |
| 4,829,245 | 5/1989 | Echasseriau et al. | 324/174 |
| 4,849,728 | 7/1989 | Goll et al. | 336/110 |
| 4,888,551 | 12/1989 | Hata et al. | 324/174 |
| 5,039,942 | 8/1991 | Buchschmid et al. | 324/207.15 |
| 5,148,105 | 9/1992 | Okada | 324/207.14 |
| 5,278,496 | 1/1994 | Dickmeyer et al. | 324/174 |

FOREIGN PATENT DOCUMENTS 2640049 6/1990 France ................. 324/174

Primary Examiner—Sandra L. O'Shea
Assistant Examiner—Roger Phillips
Attorney, Agent, or Firm—Longacre & White

[57] ABSTRACT

A bobbin unit comprising a cylindrical bobbin with reeled coil, a pole piece set in the bobbin, a magnet disposed at the edge of the poll piece, and a terminal connected to the terminal, is mounted on a stay with an engaging extrusion of the bobbin, and the bobbin unit and the stay are covered together with a body molded with resin. An "O" ring is installed between the pole piece and the bobbin.

3 Claims, 5 Drawing Sheets

5,483,157

ROTARY SENSOR HAVING A STAY AND MOLDED BODY

This is a continuation of application Ser. No. 08/037,229 filed Mar. 26, 1993, which was abandoned upon the filing hereof.

BACKGROUND OF THE INVENTION

The invention relates to the structure of a rotary sensor particularly suitable for the wheel sensor of a vehicle.

A rotary sensor of the sort disclosed by Japanese Patent No. 63-285414 is known. According to the disclosed patent, the sensor is composed of a stay mounted on a vehicle with a case mounted on said stay and containing sensor elements such as a pole piece, and a bobbin etc. mounted on said stay. The sensor elements such as the pole piece and bobbin etc. are fixed in a molded resin case, and the case is fixed to the stay by pressing the case into a hole in the stay, and the molded resin case is formed by the unification of both case and a body.

The difficulties with this sensor are 1) that the assembly work of the whole wheel sensor is very complicated due to the difficulty of installing sensor elements such as the poll piece and the bobbin etc. in the case, and 2) that the high machining accuracy is required for the poll piece and the case to prevent water penetration through the tolerated gap between the pole piece and the case, because no particular device for water proofing the tolerated gap is provided.

OBJECTS AND SUMMARY OF THE INVENTION

It is an object of the present invention to provide a rotary sensor that introduces easy assembly and improved water proofing, and to lower he requirement of the machining accuracy of a pole piece periphery and a case inner periphery.

As a means to solve the above mentioned problems, a rotary sensor is to comprise a bobbin unit that mainly consists of a cylindrical bobbin with a reeled coil, a pole piece set in said bobbin, a magnet disposed at the edge of said poll piece, and a terminal connected to said coil, a stay mounting said bobbin unit thereon, and a molded resin body uniting said stay with said bobbin unit. Further, A rotary sensor has said bobbin unit mounted in engagement with said stay, and said resin body is laid between said bobbin unit and said stay. Further more, the rotary sensor has an "O" ring installed between said pole piece and said bobbin.

BRIEF DESCRIPTION OF THE DRAWINGS

The above and other objects of the invention will be seen by reference to the description taken in connection with the accompanying drawings, in which.

DETAILED DESCRIPTION OF THE PREFERRED EMBODIMENT

In order to demonstrate the invention, the following example is set forth for the purpose of illustration.

Figure 4:
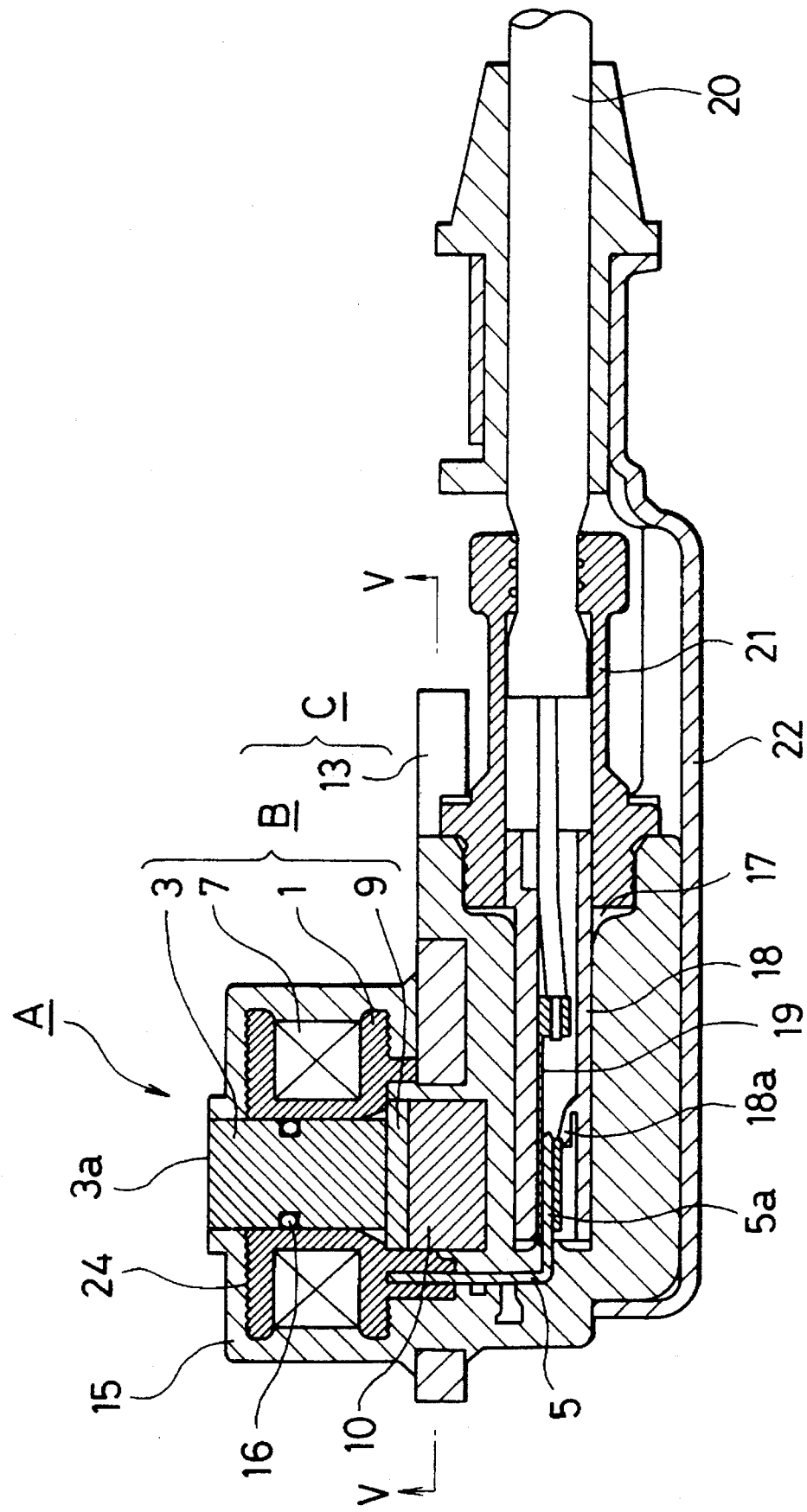
FIG. 4 is a cross section of a rotary sensor relating to the present invention.

Referring to an embodiment of the invention illustrated in FIG. 4, a wheel sensor A includes a bobbin unit B comprising a bobbin 1 and a pole piece 3, a stay 13 mounting said bobbin unit B thereon, and a body 15 that said stay 13 and said bobbin unit B are fixed together therein.

Figure 1:
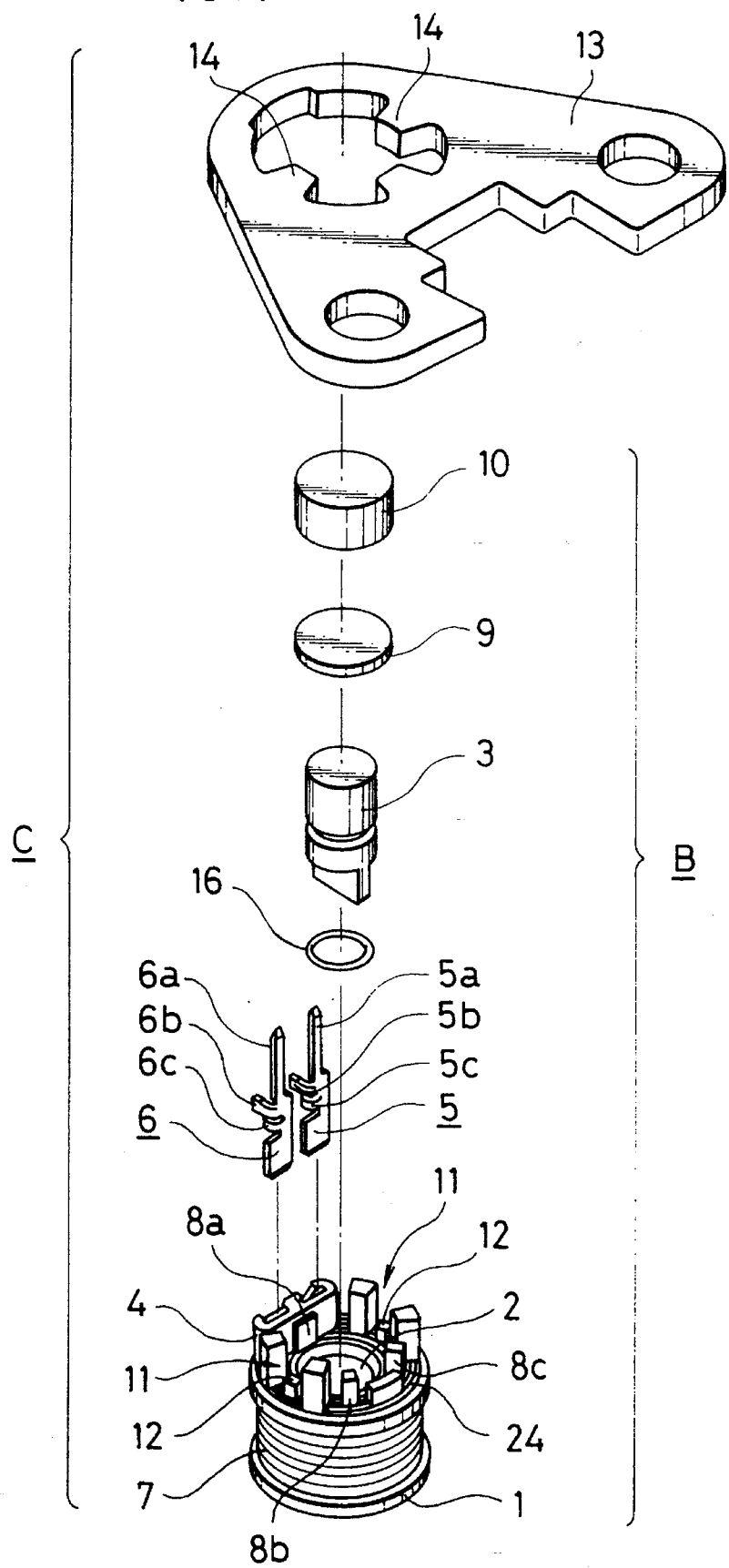
FIG. 1 is an exploded view of a sensor unit relating to the present invention.

As shown in FIGS. 1 and 4, a cylindrical bobbin 1 has a cylindrical inner periphery 2 centered around the axis line of the bobbin 1, in which the pole piece 3 is pressed and of fixed thereto. A terminal attachment 4 is mounted at the end face of the bobbin 1, and a pair of male terminals 5, 6 are pressed and fixed in said terminal attachment 4, wherein the terminals 5, 6 have connecters 5a, 6a at the front edges, terminal portions 5b, 6b and calk portions 5c, 6c in the middle. The edge of a coil 7 is connected to the terminal portion 5b of the terminal 5 and goes through a calk portion 5c and then reeled on an outer periphery of the bobbin 1. The other end of the coil 7 goes through the calk portion 6c of another terminal 6, and is then cut off after connecting it to the connector 6b. The calk portions 5c, 6c are to be pressed and fused after the press of the calk portion 5c, 6c.

Three circular guide protrusions 8a, 8b, 8c are formed on the end face of said bobbin 1, and a cylindrical magnet 9 and a yoke 10 are slided into a cylinder hole of said bobbin 1 in order. Then after the insertion of the magnet 9 and the yoke 10, the terminal 5, 6 are bent up at the terminal portions 5b, 6b. A bobbin unit B is composed as described above (Refer to FIG. 2 ). A unification, as above described, of the sensor elements such as a bobbin 1, a pole piece 3, terminals 5, 6, a magnet 9, and a yoke 10 improves the workability of assembling the wheel sensor A, and at the same time enables the automated assembly.

Figure 2:
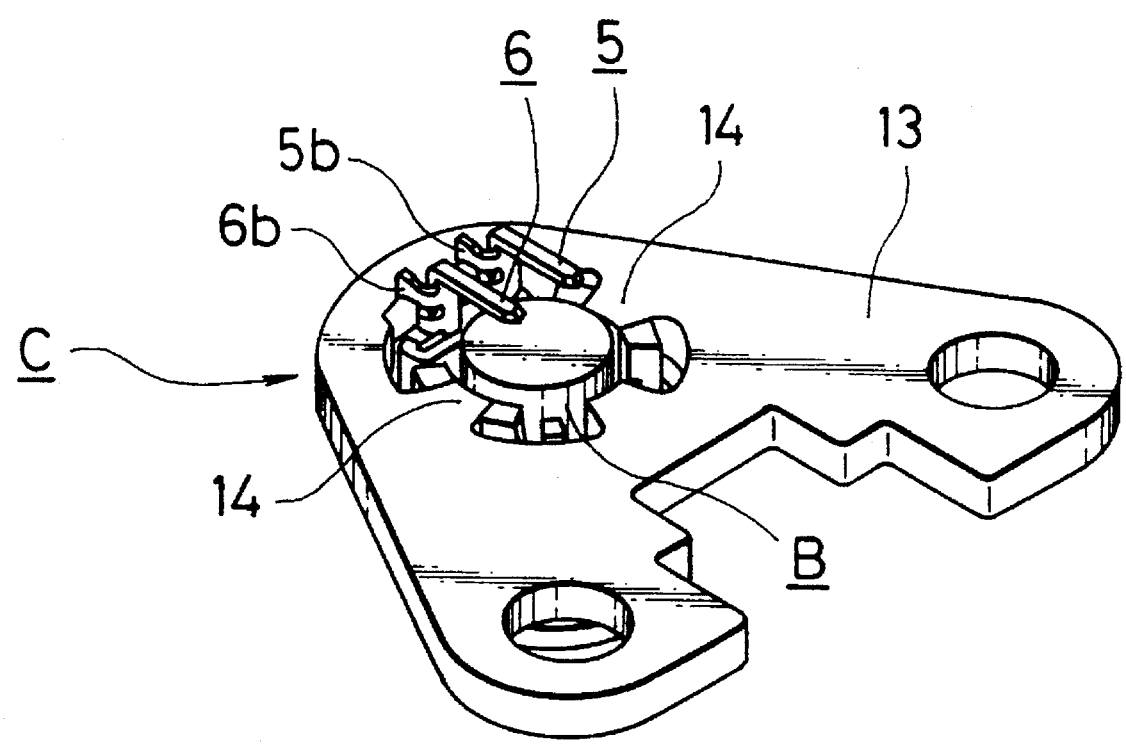
FIG. 2 is a assembly view of a sensor unit relating to the present invention.

As shown in FIG. 1 and 2 for the description of a sensor unit C, the end face of said bobbin i has two engaging key concaves 11 in which contact faces 12 are formed, and the engaging key concaves 11 are set according to the locations of the engaging key convexes 14 of the stay 13, and pressed into the convexes 14 until contact faces 12 of the concaves 11 touch to the lateral face of said engaging key convexes 14, namely, establishing the design position of the concaves 11 with respect to the stay 13.

Figure 3:
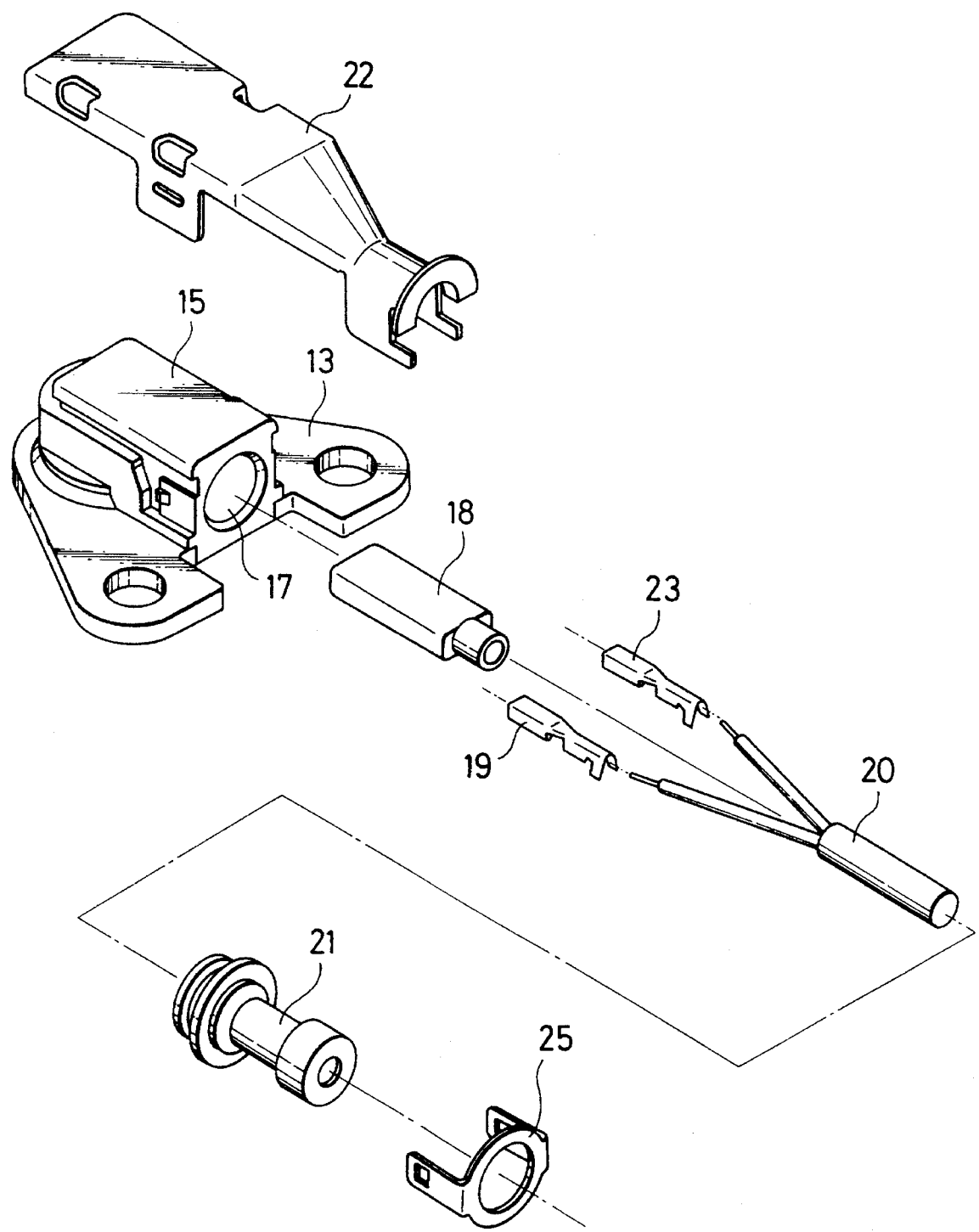
FIG. 3 is an exploded view of a rotary sensor relating to the present invention.
Figure 5:
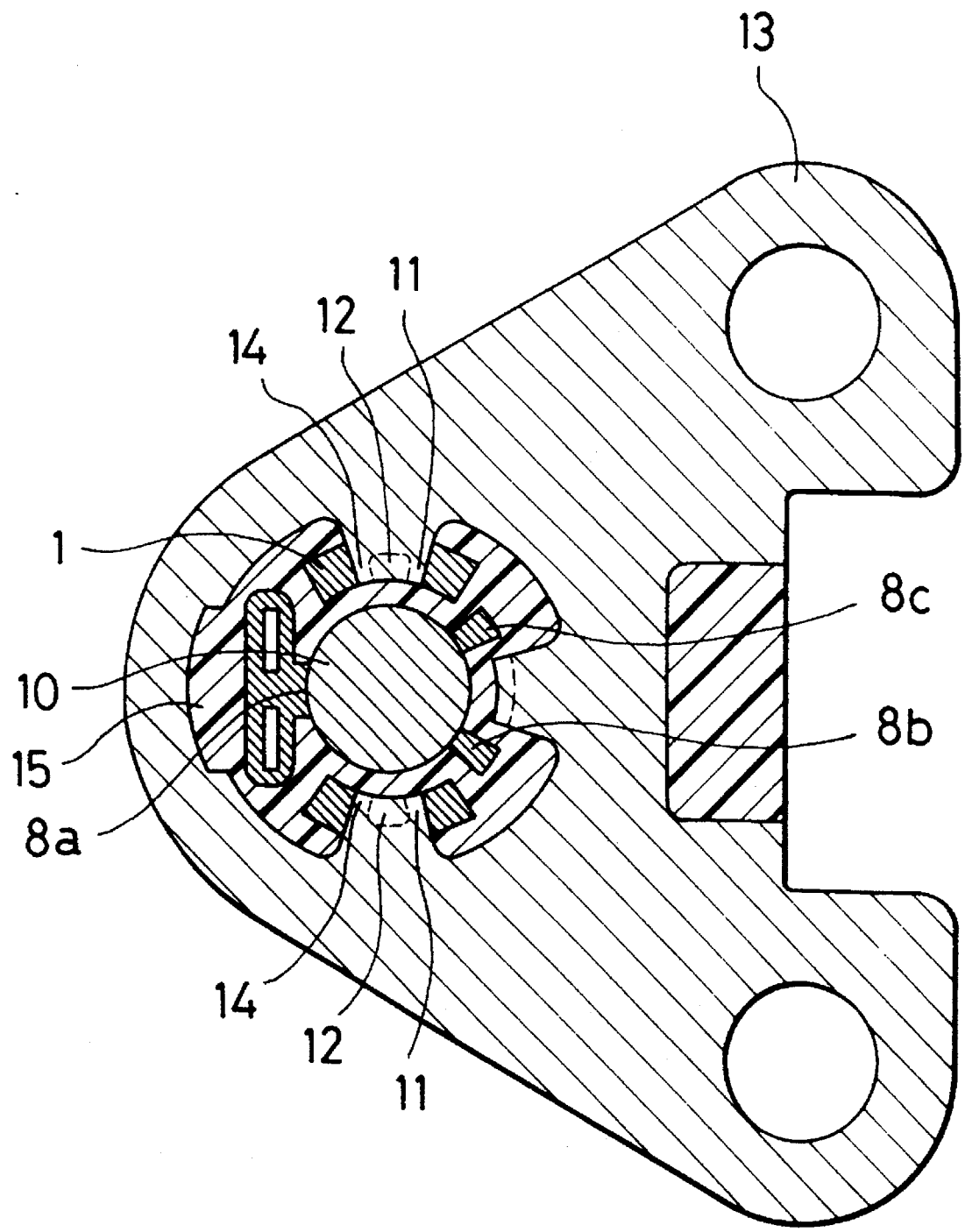
FIG. 5 is a cross section taken along the line V—V in FIG. 4.

As shown in FIGS. 3, 4, and 5, the sensor unit C includes the bobbin unit B and the stay 13, and is covered with the body 15 made of molded resin, which affixes the bobbin unit B on the stay 13. In this manner, by forming the body 15 around the sensor unit C comprising the bobbin unit B and the stay 13, with molded resin, the bobbin unit B and the stay 13 are united firmly, and consequently the water proofing is more effective. In this case, as shown in FIG. 5, said molded resin body 15 exists between the pole piece 3 and the stay 13, except engaging key joint portions of said engaging key concaves 11 and said engaging key convexes 14, which makes the bobbin 1 or the body 15 exist around the juncture between the pole piece 3, or the magnet 9, or the yoke 10, and the stay 13, and this structure duely helps to prevent the water penetration into the terminals 5, 6 and the coil 7, even though the water penetrated between the stay 13 and the body 15. Because of this, the outer periphery of the pole piece 3 and the inner periphery 2 of the bobbin 1, do not require such high machining accuracy, and the manufacturing process of the pole piece 3 and the bobbin 1 becomes much easier. Referring to FIG. 1, since the labyrinth 24 is formed on both sides, i.e. top and bottom, of the bobbin 1, even where the water penetration occurred, this labyrinth 24 would help to extend the reaching distance of the water before penetration.

As shown in FIG. 3 and 4, an open cavity 17 is made in the body 15 on the rear side of said stay 13. At the deep portion of said cavity 17, connectors 5a, 6a of said terminals 5, are located. The mere insertion of a joint 18 into said cavity 17 provides firm fixation of the joint 18 with a claw 18a, in said joint 18, and at the same time, it gives connections of female terminals 19, 23 connected to an outgoing signal cord 20, with said terminal 5, 6. The entrance of said cavity 17 is protected from water penetration with rubber boot 21, and said rubber boot 21 is firmly affixed to on the body 15 with a rubber holder 25. Said outgoing signal cord 20 is also firmly affixed with a cord clamper 22 affixed on the body 15.

As shown in FIG. 4, a front face 3a of the pole piece is exposed out of a body 15, and the front face 3a is made to receive a change of magnetic line of force, and the change of the magnetic line of force received by the front face 3a of the pole piece 3 is converted to electrical signal by the coil 7 reeled on the bobbin 1 and transmitted to measuring equipment not shown in the drawings, through the outgoing signal cord 20.

As described above, a rotary sensor comprising a cylindrical reeled bobbin unit including a pole piece set in said bobbin, a magnet disposed at the edge of pole piece, and a terminal connected to said coil; a stay mounting said bobbin unit thereon; and a molded resin body united said stay with said bobbin unit, has superior effects such as improving the workability of the assembly, and protecting from easy water penetration due to the firm unification of the bobbin unit and the stay, and moreover enabling the automated assembly. Further, as a benefit of this invention, since the molded resin body lies between the bobbin unit and the stay, which makes either the bobbin or the body exists all around the juncture between the pole piece or the magnet, and the stay, even when the water has penetrated between the stay and the body, the sensor still can prevent the water penetration to the terminal and the coil. Further more, since the provision of an "O" ring 16 between said pole piece and bobbin, can prevent the water penetration into the tolerated gap between the pole piece and the body, the outer periphery of the pole piece and the inner periphery of the bobbin does not require such high machining accuracy so that the manufacturing of said materials becomes so easy.

What is claimed is:

1. A rotary sensor comprising:

a bobbin unit including
   a cylindrical bobbin with a reeled coil,
   a pole piece set in said bobbin,
   a magnet disposed at the end of said pole piece, and
   a terminal connected to said coil, a stay supporting said bobbin unit, said stay comprising an engagement aperture passing through the stay and formed with engaging key convexes;

wherein said bobbin unit further comprises key elements passing into said engagement aperture and engaging said engaging key convexes to prevent relative movement of the bobbin with respect to the stay; and an in situ molded resin body uniting said stay with said bobbin unit, wherein said resin body is at least partially interposed between said bobbin unit and said stay within said engagement aperture to lock said bobbin with respect to said stay.

2. The rotary sensor as recited in claim 1, wherein said stay defines first and second planar surfaces, said engagement aperture extending from said first planar surface to said second planar surface, and wherein said bobbin further comprises at least one guide protrusion adapted to abut said first planar surface.

3. The rotary sensor as recited in claim 1, wherein said terminal passes through said engagement aperture.

* * * * *